Dec. 18, 1945.  G. R. ANDERSON  2,391,115
CONDUCTOR CONNECTION FOR ELECTRICAL MACHINES
Original Filed June 29, 1942

INVENTOR
GORDON R. ANDERSON
BY Paul L. Krober
ATTORNEY

Patented Dec. 18, 1945

2,391,115

UNITED STATES PATENT OFFICE 2,391,115

CONDUCTOR CONNECTION FOR ELECTRICAL MACHINES

Gordon R. Anderson, Beloit, Wis., assignor to Fairbanks, Morse & Co., Chicago, Ill., a corporation of Illinois Original application June 29, 1942, Serial No. 448,933. Divided and this application August 14, 1943, Serial No. 498,647

3 Claims. (Cl. 171—252)

This invention relates generally to improvements in electrical machines, and has particular reference to improved means incorporated in an electrical machine frame structure, affording selective facilities for effecting conductor connection to electrical apparatus, such as a stator winding or the like, within the frame structure. The present subject matter is a division of my application for Ventilation of electrical machines, filed June 29, 1942, and bearing Serial No. 448,933, now Patent No. 2,357,923, issued Sept. 12, 1944.

The principal object of the invention resides in the provision in a frame structure or housing for an electrical machine, such as a motor or the like, of an improved arrangement for effecting electrical connection to the machine through a conduit box advantageously located at one side of the housing and intermediate the housing ends, or through a frame opening adjacent said box and near the under side of the housing.

Further objects and advantages will appear readily from the following description of a preferred embodiment of the invention as exemplified in the accompanying drawing, wherein.

Figure 1:
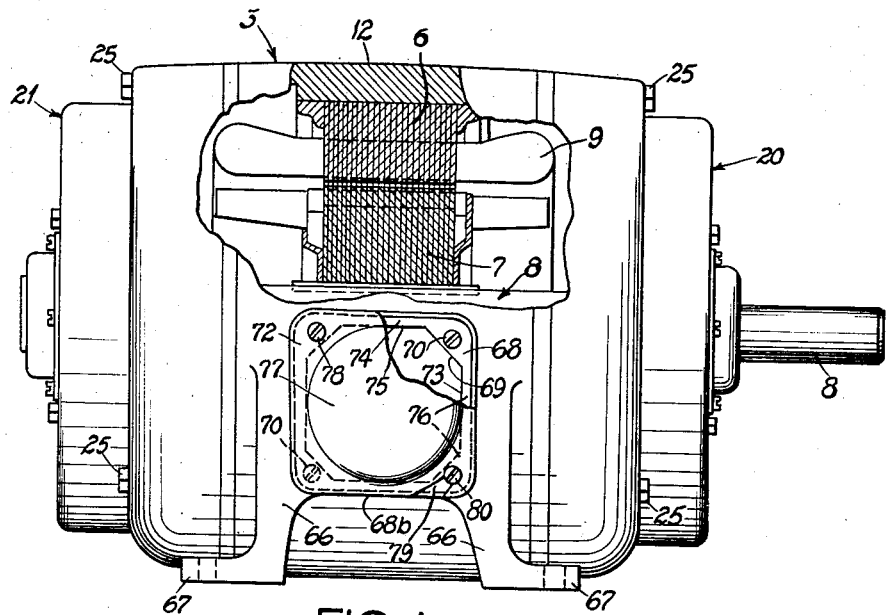
Fig. 1 is a longitudinal side elevation partly in section, of a dynamo electric machine embodying the features of the present invention, the view illustrating a conduit box thereon having a portion thereof broken away to illustrate a preferred manner of box connection to the machine housing.

Referring now to the drawing by appropriate characters of reference, the numeral 5 designates generally a dynamoelectric machine embodying the improvements of the present invention. For the purposes of the present exemplary disclosure, the machine herein illustrated may be an induction motor having a wound stator indicated generally at 6, and a squirrel-cage rotor 7 suitably secured upon a rotor shaft 8. The stator 6 may be of annular form and is comprised by preference, of iron laminations slotted to receive the stator windings 9. Supporting the machine stator 6 is an annular frame 12, while the rotor 7 may be operatively supported through shaft 8 in the usual manner, as by suitable shaft bearings (not shown) in frame closures or end-bells 20 and 21, the latter being suitably secured in assembly to the frame 12 as by bolts 25. To facilitate mounting of the machine, the frame 12 may be formed as shown, to have lateral projections 66 on opposite sides thereof, each of which terminates in a projecting foot portion 67.

Figure 2:
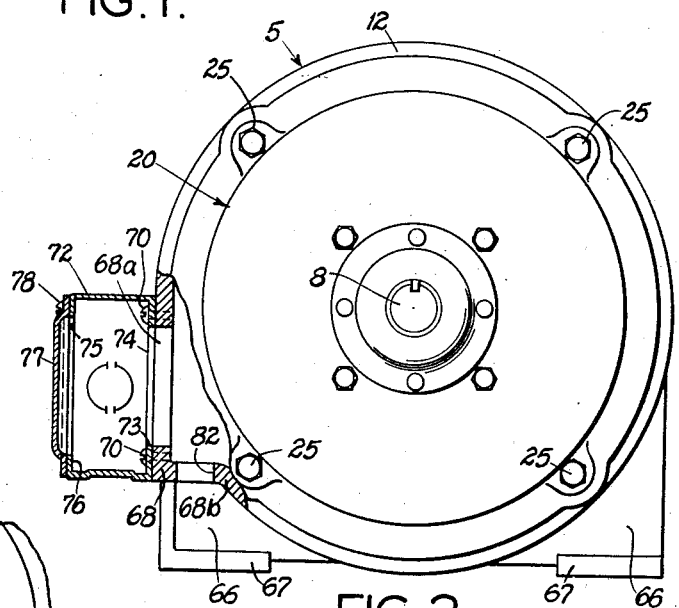
Fig. 2 is an end elevation of the machine frame or housing, with the conduit box and a portion of the housing shown in section.
Figure 3:
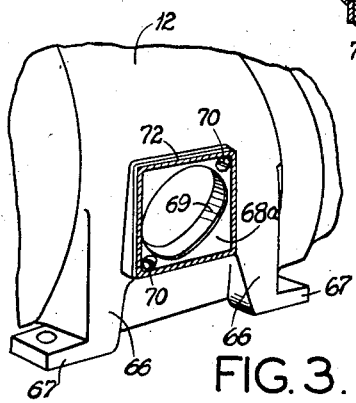
Fig. 3 is a somewhat reduced, fragmentary perspective view of the machine, illustrating features of the present improvements.

According to the present improvements, provision is made for facilitating electrical connection selectively through the motor frame, to the stator winding 9. As shown by the several figures of the drawing, the motor frame 12 is formed to have at one side thereof and between the frame projections 66, a frame boss 68 of hollow form (Fig. 2), defining a forward planar wall portion 68a which is substantially parallel to the vertical axial plane of the machine, and a lower planar wall portion 68b extending inwardly from wall portion 68a and substantially parallel with the horizontal axial plane of the machine. The wall 68a of boss 68 is provided with a generally circular opening 69 therein to provide for the passage of conductor leads (not shown) to the frame interior, as for connection to the stator windings 9. Removably attached to the boss 68, as by suitable screws 70, is a conduit box 72, the box having an opening 73 in its rear wall 74 registering with the boss opening 69, and a further opening 75 in its front wall 76. A closure member or cover 77 for the box opening 75, is removably secured over the opening by a screw 78 about which the cover may be pivoted to give access to the box interior, and by a hook-like recess 79 formed in one corner of the cover, for connection with a screw or stud 80. An alternative connection to the motor is provided for by an opening 82 formed in the lower wall portion 68b of frame boss 68, this wall and its opening being located inwardly of the projections 66 and near the under side of the frame 12 as appears in Fig. 2. The motor leads (not shown) may be directly introduced through opening 82, or one end of a conduit (not shown) containing such leads, may be passed through this opening, as desired. Also, the opening 82 may be tapped (not shown) for threaded connection of a conduit thereto. When the opening 82 is employed in effecting electrical connection to the motor, the conduit box 72 may be and preferably is removed. In such instance the opening 69 may be closed by the box cover 77. The advantages are believed apparent in respect to the present provisions for selective conductor connection to the motor, the opening 82 in particular being wholly within the confines of the frame structure, and hence out of the way.

Although the invention is here illustrated and described as to the presently preferred embodiment thereof, it will be understood that modifications in the arrangement shown may be made without departing from the spirit and intended scope of the invention as hereinafter claimed.

I claim:

1. In a dynamo electric machine including a stator having a winding, a frame member for enclosing said stator, formed to provide longitudinally spaced mounting projections on opposite sides thereof, the frame member being formed further, to provide a laterally projecting boss arranged substantially between the mounting projections on one side of the member, said boss providing angularly related wall portions and having an opening in each of said wall portions thereof, affording selective access to the frame interior for conductor connection to the stator winding therein, and a conduit box removably secured to said boss over one of said openings, said conduit box including a cover removably attached thereto, adapted for direct securement to said boss upon removal of the conduit box, to close said one opening.

2. In a dynamo electric machine including a stator having a winding thereon, a frame member for supporting and enclosing said stator and winding, said frame member being formed to provide on opposite sides thereof, longitudinally spaced mounting projections, and formed further to provide a laterally projecting boss substantially centrally between the mounting projections on one side of the frame, said boss having at least two openings therethrough, affording selective access to the frame interior for conductor connection to the stator winding therein, said openings being arranged such that the axis of one thereof is substantially normal to the axis of the other, and further, such that one of the openings is disposed inwardly of the lateral confines of the frame and its mounting projections, and a conduit box removably secured to said boss over one of said openings.

3. In a dynamo electric machine including a stator having a winding thereon, a frame member for supporting and enclosing said stator and winding, said frame member being formed to provide on opposite sides thereof, longitudinally spaced mounting projections, and formed further to provide a laterally projecting boss substantially centrally between the mounting projections on one side of the frame, said boss defining vertically and horizontally directed walls substantially paralleling respectively, the vertical and horizontal axial planes of the frame member, the horizontal wall extending inwardly to the lower side portion of the frame, each of said walls having an opening therethrough, affording selective access to the stator winding therein, the opening in said horizontal wall being located therein so as to be disposed inwardly of the lateral confines of the frame and its mounting projections, and a conduit box removably secured to said boss over the opening in said vertical wall.

GORDON R. ANDERSON.